US012428755B2

United States Patent
Charleux et al.

(10) Patent No.: US 12,428,755 B2
(45) Date of Patent: Sep. 30, 2025

(54) FIBER TEXTURE FOR A CASING MADE OF COMPOSITE MATERIAL WITH IMPROVED IMPACT RESISTANCE

(71) Applicants: SAFRAN, Paris (FR); SAFRAN AIRCRAFT ENGINES, Paris (FR)

(72) Inventors: François Charleux, Moissy-Cramayel (FR); Dominique Marie Christian Coupe, Moissy-Cramayel (FR); Hervé Grelin, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 1222 days.

(21) Appl. No.: 17/262,092

(22) PCT Filed: Jul. 18, 2019

(86) PCT No.: PCT/FR2019/051807
§ 371 (c)(1),
(2) Date: Jan. 21, 2021

(87) PCT Pub. No.: WO2020/021185
PCT Pub. Date: Jan. 30, 2020

(65) Prior Publication Data
US 2021/0292938 A1    Sep. 23, 2021

(30) Foreign Application Priority Data
Jul. 23, 2018 (FR) .................................. 1856798

(51) Int. Cl.
*D03D 1/00* (2006.01)
*D03D 11/00* (2006.01)
(Continued)

(52) U.S. Cl.
CPC ........... *D03D 1/0052* (2013.01); *D03D 11/00* (2013.01); *D03D 15/267* (2021.01);
(Continued)

(58) Field of Classification Search
CPC .. D03D 15/267; D03D 1/0052; D03D 15/275; D03D 11/00; D03D 25/005; D10B 2505/02; F01D 25/24
See application file for complete search history.

(56) References Cited

U.S. PATENT DOCUMENTS 4,368,234 A * 1/1983 Palmer .................. B29C 70/202
442/212
5,538,781 A 7/1996 Rao et al.
(Continued)

FOREIGN PATENT DOCUMENTS

CN     101713115 A    5/2010
CN     103261499 A    8/2013
(Continued)

OTHER PUBLICATIONS

International Search Report as issued in International Patent Application No. PCT/FR2019/051807, dated Nov. 15, 2019.

*Primary Examiner* — Jennifer A Gillett
(74) *Attorney, Agent, or Firm* — Pillsbury Winthrop Shaw Pittman LLP

(57) ABSTRACT

A strip-shaped fibrous texture has a three-dimensional or multi-layered weaving between a plurality of layers of warp yarns or strands and a plurality of layers of weft yarns or strands extending in the lateral direction. The fibrous texture includes a first section extending along the longitudinal direction from a proximal portion of the texture and in which one or more layers of the plurality of layers of weft yarns or strands consist of a plurality of groups of yarns or strands each including at least one carbon fiber yarn or strand and one glass fiber yarn or strand. The carbon fiber yarn or strand and the glass fiber yarn or strand of each group of yarns being woven together according to the same weaving pattern or weave. The fibrous texture further includes a second
(Continued)

section present between the first section and a distal portion of the fibrous texture.

11 Claims, 8 Drawing Sheets

(51) Int. Cl.
  *D03D 15/267* (2021.01)
  *D03D 15/275* (2021.01)
  *D03D 25/00* (2006.01)

(52) U.S. Cl.
  CPC ......... *D03D 15/275* (2021.01); *D03D 25/005* (2013.01); *D10B 2101/06* (2013.01); *D10B 2101/12* (2013.01); *D10B 2505/02* (2013.01)

(56) References Cited

U.S. PATENT DOCUMENTS

| | | | | |
|---|---|---|---|---|
| 2005/0186081 A1* | 8/2005 | Mohamed | ............ | D03D 15/267 |
| | | | | 416/226 |
| 2006/0057920 A1* | 3/2006 | Wigent, III | ............. | B29C 70/24 |
| | | | | 428/105 |
| 2010/0105269 A1* | 4/2010 | Goering | ................. | B29B 11/16 |
| | | | | 442/205 |
| 2017/0335494 A1* | 11/2017 | Kim | ..................... | D03D 1/0035 |
| 2018/0363176 A1* | 12/2018 | Shan | .................... | D03D 41/004 |

FOREIGN PATENT DOCUMENTS

| | | | | |
|---|---|---|---|---|
| CN | 105358429 A | 2/2016 | | |
| CN | 107250450 A | 10/2017 | | |
| EP | 3 292 991 A1 | 3/2018 | | |
| FR | 2 706 913 A1 | 12/1994 | | |
| WO | WO 2006/136755 A2 | 12/2006 | | |
| WO | WO 2017/109403 A1 | 6/2017 | | |
| WO | WO-2017108692 A1 * | 6/2017 | ......... | B29C 66/7212 |

\* cited by examiner

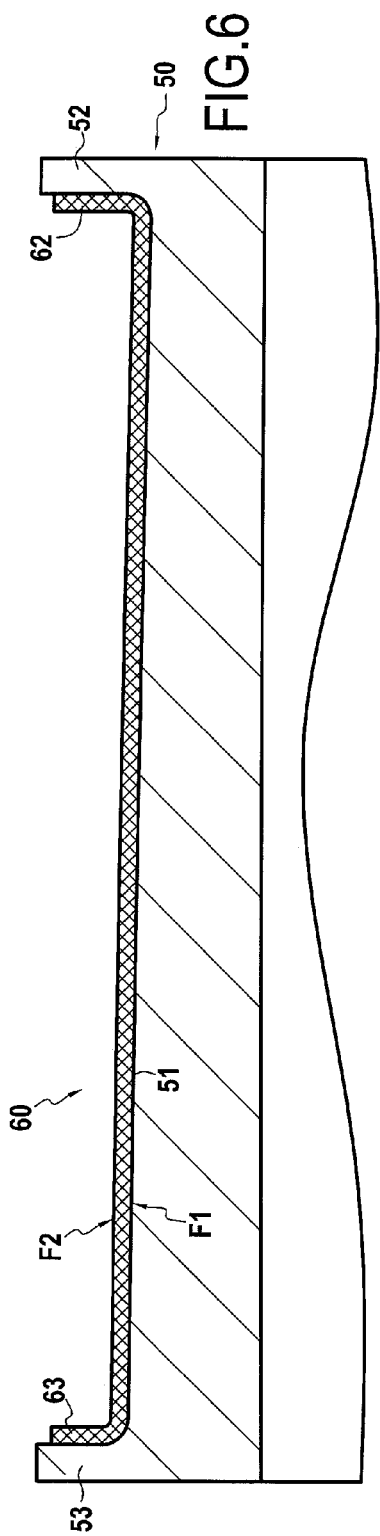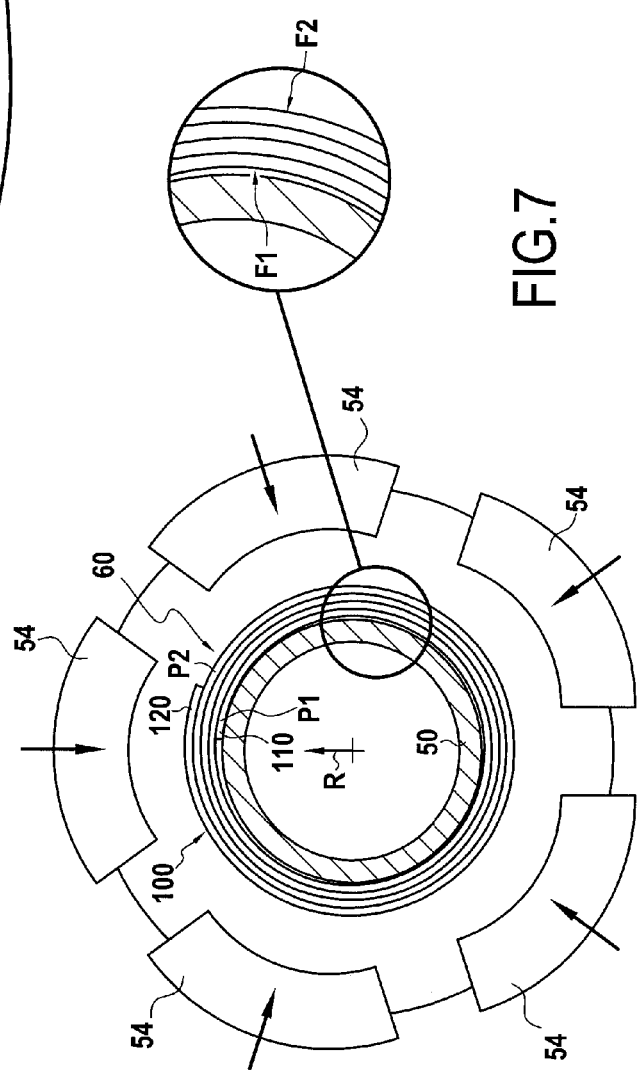

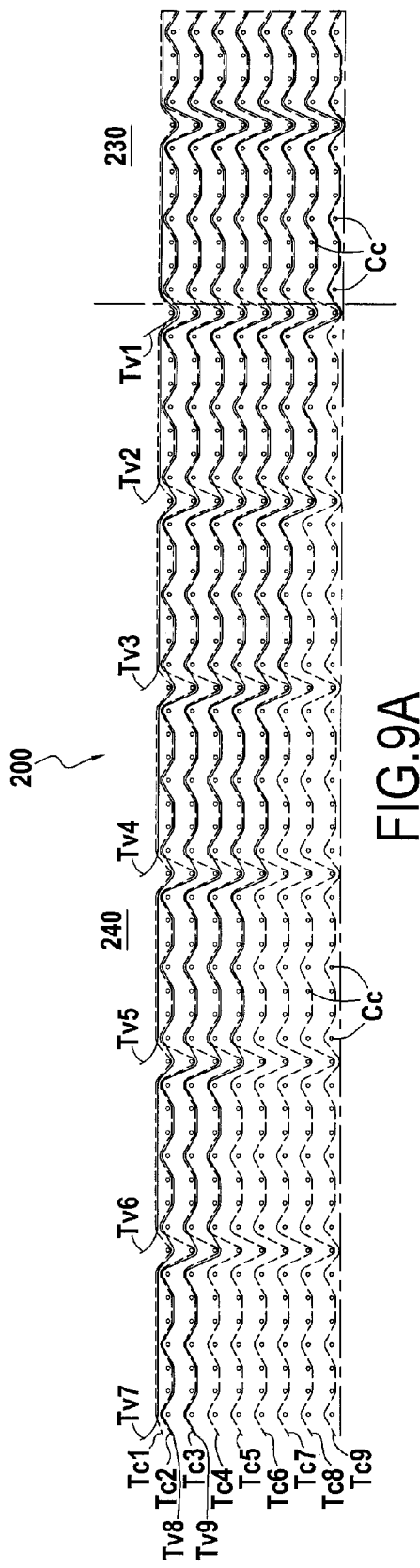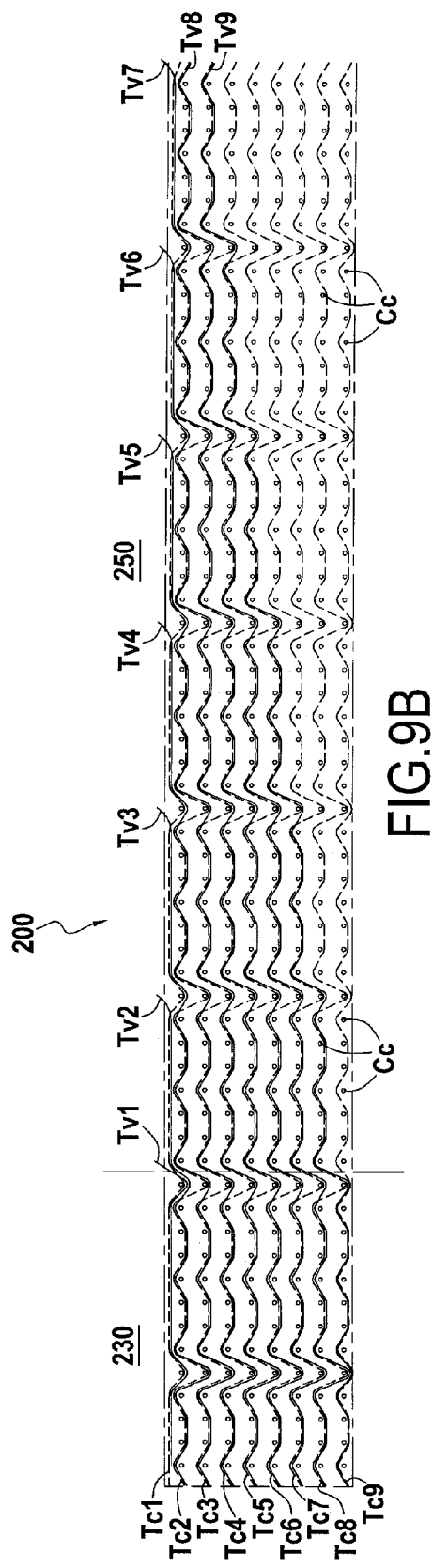

FIBER TEXTURE FOR A CASING MADE OF COMPOSITE MATERIAL WITH IMPROVED IMPACT RESISTANCE

CROSS-REFERENCE TO RELATED APPLICATIONS

This application is the U.S. National Stage of PCT/FR2019/051807, filed Jul. 18, 2019, which in turn claims priority to French patent application number 1856798 filed Jul. 23, 2018. The content of these applications are incorporated herein by reference in their entireties.

BACKGROUND OF THE INVENTION

The present invention relates to a fibrous texture which can be used, particularly but not exclusively, to form the fibrous reinforcement of an aircraft engine fan casing made of composite material.

The manufacture of a casing made of composite material begins with the production of a fibrous texture in the form of a strip, the fibrous texture being produced by three-dimensional weaving between a plurality of layers of warp yarns and a plurality of layers of weft yarns. The fibrous texture thus obtained is wound over several turns on a mold or tooling having the form of the casing to be produced and held between the mold and segments forming a counter-mold so as to obtain a fibrous preform.

Once the fibrous preform has been produced, that is to say at the end of the winding of the fibrous texture, the tooling carrying the fibrous preform is closed by counter-molds and then transported up to an oven or furnace in which the densification of the perform with a matrix is made, the matrix being in particular able to be obtained by injection and polymerization of a resin into the fibrous preform.

A fan casing fulfills three main functions, namely:
- ensuring the connection of parts of the engine with each other,
- defining the air inlet flowpath in the engine,
- ensuring the retention by retaining the debris ingested inside the engine or the blades or blade fragments discharged by centrifugation, in order to prevent them from passing through the casing and reaching other portions of the aircraft.

The two first functions are not very demanding in terms of mechanical properties but are permanently active. On the other hand, the third function, even if it is used very little, is very demanding in terms of mechanical properties.

During a Fan Blade-Out (FBO) event, the event can be split into different phases for the casing:
- Phase 1: contact between the blade and the casing,
- Phase 2: shear by the leading edge of the lost blade of the material of the casing,
- Phase 3: deformation of the casing under the effect of high energy,
- Phase 4: restoring of the energy stored in the casing interlinked to the fragment of the lost blade,
- Phase 5: establishment of the Windmilling.

During phase 1, it is a significant stiffness that is required from the casing in order to deform to a minimum under the effect of the contact with the blade. During this phase, energy is stored by the casing in the form of deformation.

During phase 2, the material of the casing should show shear properties. The material is sheared and the energy is dissipated by this shear.

During phase 3, the projectile penetrates with more difficultly the casing and the energy stored by the projectile is fully absorbed by the deformation of the casing. During this phase, a high rate of deformation is required from the material of the casing.

During phase 4, the energy is restored by deformation of the casing to return to the initial geometry.

During phase 5, the casing is subjected to a fatigue stress with significant mechanical loading.

The casings of the prior art generally ensure this function satisfactorily. It remains however possible to further improve the mechanical strength of some casings on impact with a projectile, particularly a blade when there is detachment of the latter and projection thereof onto the casing.

An example of a fan casing made of composite material with a reinforced retention area is described in particular in document WO 2017/109403.

OBJECT AND SUMMARY OF THE INVENTION

The invention concerns, according to a first aspect, a strip-shaped fibrous texture extending in a longitudinal direction over a determined length between a proximal portion and a distal portion and in a lateral direction over a determined width between a first lateral edge and a second lateral edge, the fibrous texture having a three-dimensional or multi-layered weaving between a plurality of layers of warp yarns or strands extending in the longitudinal direction and a plurality of layers of weft yarns or strands extending in the lateral direction, characterized in that the fibrous texture comprises a first section extending along the longitudinal direction over a determined length from the proximal portion and in which one or more layers of the plurality of layers of weft yarns or strands consist of a plurality of groups of yarns or strands each comprising at least one carbon fiber yarn or strand and one glass fiber yarn or strand, the carbon fiber yarn or strand and the glass fiber yarn or strand of each group of yarns being woven together according to the same weaving pattern or weave, the fibrous texture further comprising a second section present along the longitudinal direction between the first section and the distal portion of said fibrous texture in which the layers of the plurality of weft yarns or strands include carbon fiber yarns or strands.

The fibrous texture is intended to be wound in several turns in order to form a fibrous reinforcement of a casing made of composite material. The first section is intended to form the radially inner portion of this fibrous reinforcement (first turn(s) of the winding). The second section is intended to form the radially outer portion of this fibrous reinforcement (last turn(s) of the winding).

The inventors have found that it was possible to improve the resistance of the casing on impact, for example, with a detached blade, by judiciously placing glass fiber yarns or strands among the carbon fiber yarns or strands in the fibrous texture. Indeed, the glass fiber yarns or strands have a shear and tensile elongation strength much higher than the one presented by the carbon fiber yarns or strands. Thus, the fibrous texture according to the invention comprises glass fiber weft yarns or strands in the first section intended to form the start of the winding and located on the side of the impact with the blade, in order to confer greater shear strength to this first section. In addition, the insertion of glass fiber yarns or strands in the weft direction is particularly adapted to the kinetics of a blade-out event because the largest dimension of the projectile is positioned perpendicularly to the weft yarns or strands.

Thereby, this limits the depth of penetration of a projectile, for example a blade or a blade portion, impacting the inner surface of the casing. Thereby, this preserves a larger portion of the casing material, which allows effectively ensuring the management of the phases described above (in particular phases 3 to 5) during a blade-out event or blade fraction.

By using groups of yarns or strands each comprising at least one carbon fiber yarn or strand and one glass fiber yarn or strand in the first section, it is possible to perform two different functions. Indeed, the carbon fiber yarns or strands confer an axial stiffness necessary for the mechanical function required from the casing, in particular during phases 1 to 5 described above, while the glass fiber yarns or strands confer high shear strength for the shear absorption function requested from the casing during phase 2, described previously.

The invention is therefore based on the implementation of two different materials, namely carbon and glass, located in particular areas of the fibrous reinforcement in order to respond optimally to the stresses of the casing during an impact event, for example a blade loss or blade fraction, while limiting the mass thereof.

In one exemplary embodiment, layers of the plurality of layers of weft yarns or strands present in the first section on the side of an inner face of the fibrous texture include or consist of a plurality of groups of yarns or strands each comprising at least one carbon fiber yarn or strand and one glass fiber yarn or strand, the other layers of weft yarns or strands present on the side of an outer face of the fibrous texture consisting of or including carbon fiber yarns or strands of. This allows maintaining good rigidity in this first section and limiting the impact of the use of glass fiber yarns or strands, these having a greater mass than the carbon fiber yarns or strands.

In one exemplary embodiment, the first section of the fibrous texture includes a retention portion extending set back from the lateral edges of said fibrous structure along the lateral direction, the retention portion comprising a greater number of glass fiber yarns or strands than in the portions adjacent to the retention portion along the lateral direction. The retention portion is intended to be present facing the blades and defines the retention area of the casing to be obtained. This retention area of the casing has the function of retaining the debris, particles or objects ingested at the inlet of the engine, or the blades or blade fragments detached and projected radially by centrifugation against the casing. Thus, the glass fiber yarns or strands whose mass is greater than that of the carbon fiber yarns or strands are concentrated in the area likely to be impacted by a projectile, particularly a blade or a blade fragment. Thereby, this lightens the overall mass of the casing.

The invention also relates to a fibrous preform of an aircraft casing comprising a winding over several turns of a fibrous texture as described above, the first section being located on the side of a radially inner face of the preform and the second section being located on the side of a radially outer face of the preform.

The invention also relates to a gas turbine casing made of composite material, comprising a fibrous reinforcement consisting of a fibrous preform as described above and a matrix densifying the fibrous reinforcement.

In one exemplary embodiment, said casing is a gas turbine fan casing.

The invention also relates to an aircraft gas turbine engine having a casing as described above.

A further object of the invention is a method for manufacturing a fibrous texture by three-dimensional or multi-layered weaving between a plurality of layers of warp yarns or strands extending in a longitudinal direction and a plurality of layers of weft yarns or strands extending in the lateral direction, the strip-shaped fibrous structure extending in the longitudinal direction over a determined length between a proximal portion and a distal portion and in the lateral direction over a determined width between a first lateral edge and a second lateral edge, characterized in that it comprises the weaving of a first section extending along the longitudinal direction over a determined length from the proximal portion and in which one or more layers of the plurality of layers of weft yarns or strands consist of a plurality of groups of yarns or strands each comprising at least one carbon fiber yarn or strand and one glass fiber yarn or strand, the carbon fiber yarn or strand and the glass fiber yarn or strand of each group of yarns being woven together along the same weaving pattern or weave, the method further comprising the weaving of a second section present along the longitudinal direction between the first section and the distal portion of said fibrous texture in which the layers of the plurality of weft yarns or strands include carbon fiber yarns or strands.

In one exemplary embodiment, layers of the plurality of layers of weft yarns or strands present in the first section on the side of an inner face of the fibrous texture include or consist of a plurality of groups of yarns or strands each comprising at least one carbon fiber yarn or strand and one glass fiber yarn or strand, the other layers of weft yarns or strands present on the side of an outer face of the fibrous texture including or consisting of carbon fiber yarns or strands.

In one exemplary embodiment, the first section of the fibrous texture includes a retention portion extending set back from the lateral edges of said fibrous structure along the lateral direction, a yarn or strand inlet portion located between the first lateral edge of the fibrous texture and the retention portion and in which glass fiber yarns or strands are gradually inserted into layers of the plurality of layers of weft yarns or strands, and a yarn or strand outlet portion located between the retention portion and the second lateral edge of the fibrous texture and in which glass fiber yarns or strands are gradually withdrawn from the layers of the plurality of layers of weft yarns or strands, the retention portion comprising a larger number of glass fiber yarns or strands than in the yarn or strand inlet and outlet portions.

BRIEF DESCRIPTION OF THE DRAWINGS

Other characteristics and advantages of the invention will emerge from the following description, given without limitation, with reference to the appended drawings, in which:

FIG. 6 is an axial sectional half-view of a casing preform obtained by winding of a fibrous texture as shown in FIG. 5, FIG. 7 is a sectional view showing the positioning of injection sectors on the preform of the casing of FIG. 6, FIGS. 9A and 9B show a cross-section taken at the first section of a fibrous texture variant according to the invention and showing a weave plane.

DETAILED DESCRIPTION OF EMBODIMENTS

The invention generally applies to fibrous textures intended for the manufacture of casings made of composite material, these casings including a barrel or a shroud with annular clamps at their ends.

Figure 1:
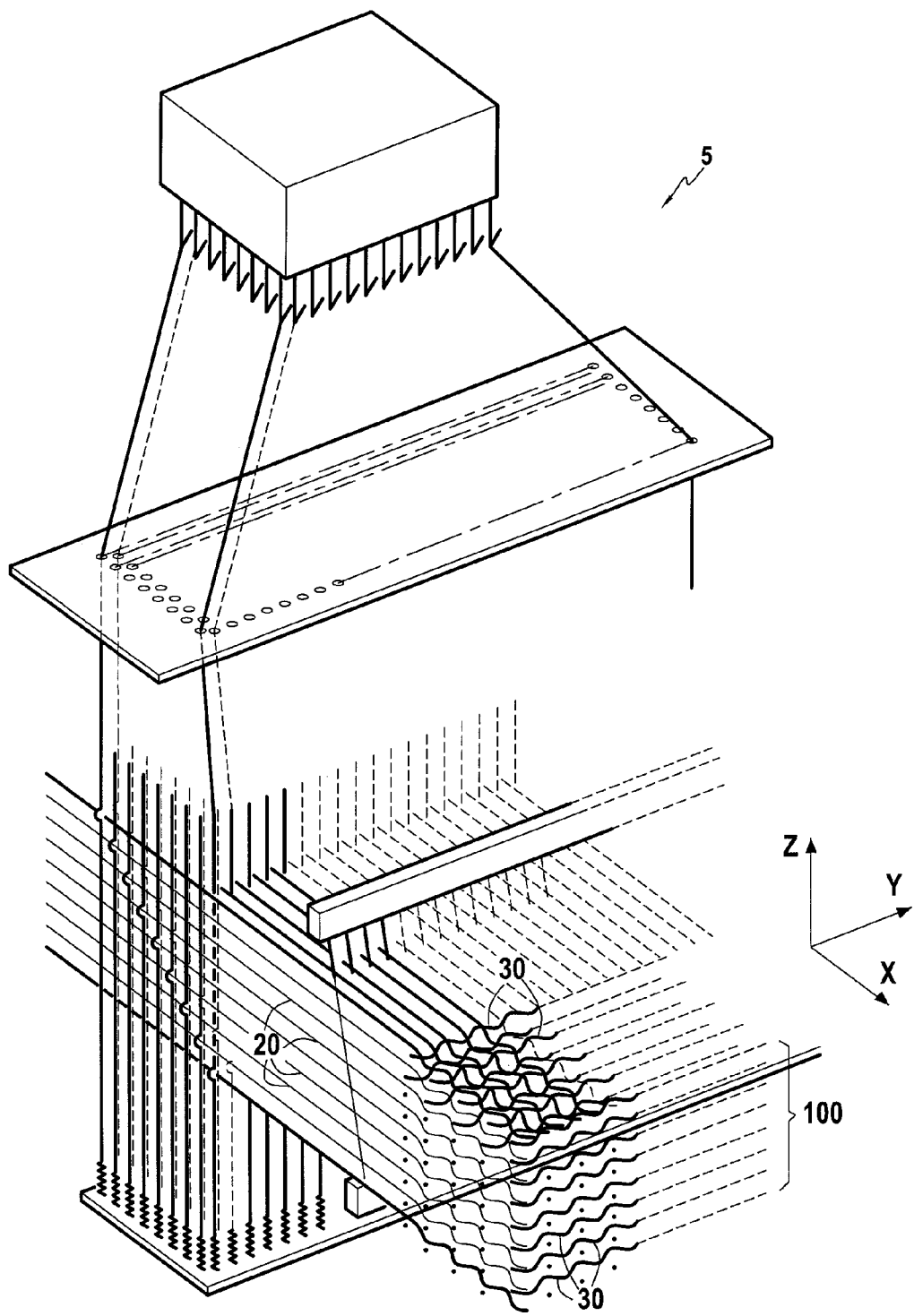
FIG. 1 is a schematic perspective view of a loom showing the three-dimensional weaving of a fibrous texture.

As represented in FIG. 1, a fibrous texture 100 is produced in a known manner by weaving by means of a jacquard-type loom 5 on which a bundle of warp yarns or strands 20 has been disposed in a plurality of layers, the warp yarns being interlinked by weft yarns or strands 30.

The fibrous texture is produced by three-dimensional weaving. By "three-dimensional weaving" or "3D weaving" is meant here a weaving mode by which at least some of the weft yarns interlink warp yarns on several layers of warp yarns or vice versa. The fibrous texture may have an interlock weave. By "interlock" weave is meant here a weave in which each layer of weft yarns interlinks several layers of warp yarns, with all the yarns of a same weft column having the same movement in the weave plane. Usable interlock-type weaves are described in document WO 2006/136755. Other weaves can be envisaged, for example multi-canvas, multi-satin and multi-twill weaves. By "multi-canvas weave or fabric" is meant here a 3D weaving with several layers of weft yarns whose base weave of each layer is equivalent to a conventional canvas-type weave but with some points of the weave that interlink the layers of weft yarns. By "multi-satin weave or fabric", is meant here a 3D weaving with several layers of weft yarns whose base weave of each layer is equivalent to a conventional satin-type weave but with some points of the weave that interlink the layers of weft yarns. By "multi-twill weave or fabric" is meant here a 3D weaving with several layers of weft yarns whose base weave of each layer is equivalent to a conventional twill-type weave but with some points of the weave that interlink the layers of weft yarns.

Figure 2:
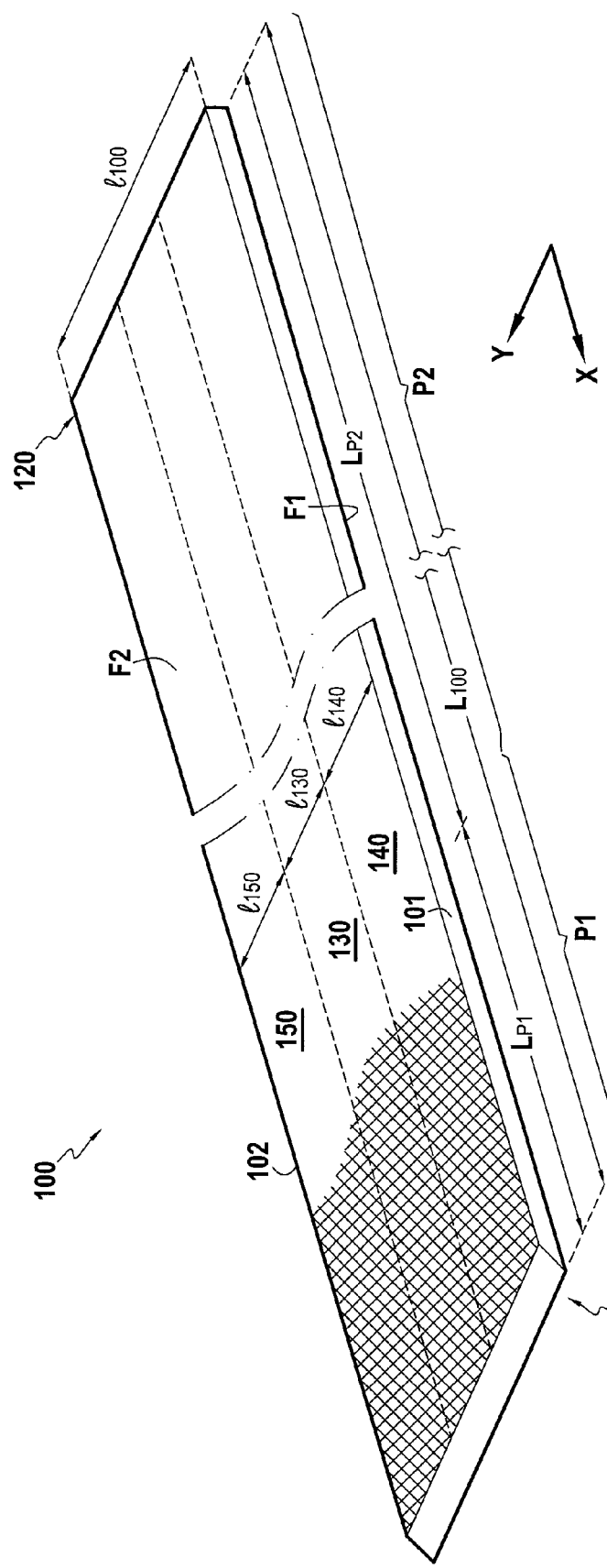
FIG. 2 is a schematic perspective view of a fibrous texture in accordance with one embodiment of the invention.

As illustrated in FIG. 2, the fibrous texture 100 has the shape of a strip which extends lengthwise in a longitudinal direction X corresponding to the direction of travel of the warp yarns or strands 20 and widthwise or transversely in a lateral direction Y between a first and a second lateral edge 101 and 102, the lateral direction Y corresponding to the direction of the weft yarns or strands 30. The fibrous texture extends longitudinally over a determined length $L_{100}$ in the direction X between a proximal portion 110 intended to form the start of the winding of a fibrous preform on a shaping tooling and a distal portion 120 intended to form the end of the winding of the fibrous preform.

The fibrous texture further has a central area 130 extending over a determined width 1130 in the direction Y, the central area 130 being intended to form the barrel or the shell of the casing. The central area 130 is intended to be present facing the blades and defines the retention area of the casing to be obtained. The central area 130 is located set back from the first 101 and second 102 lateral edges and extends over a determined width 1130 less than the width 1100 of the texture 100. The central area 130 is at an intermediate position between the first and second lateral edges 101 and 102. The central area 130 is delimited between two lateral areas 140 and 150 each extending over a determined width, respectively 1140 and 1150, in the direction Y. The first lateral area 140 extends between the first lateral edge 101 and the central area 130. The second lateral area 150 extends between the second lateral edge 102 and the central area 130. Each of the lateral areas 140 and 150 is intended at least partly to form an annular clamp of the casing.

The length $L_{100}$ of the fibrous texture 100 is determined as a function of the circumference of the tooling or of the shaping mold so as to allow the achievement of a determined number of turns of the fibrous texture, for example four turns.

The fibrous texture 100 includes a first section P1 which extends from the proximal portion 110 along the direction X. The first section P1 is intended to form the first portion of the winding forming the fibrous reinforcement of the casing (radially inner portion of this winding, see FIG. 7 which includes the radial direction R).

The fibrous texture 100 further includes a second section P2, distinct from the first section P1, and which extends along the longitudinal direction X between the first section P1 and the distal portion 120. The second section P2 is intended to form the second winding portion forming the fibrous reinforcement of the casing (radially outer portion of this winding).

In the example described here, the fibrous texture 100 extends over a length $L_{100}$ allowing achieving four winding turns on the tooling or shaping mold. Still in the example described here, the first section P1 extends over a length $L_{P1}$ defined so as to correspond to the first winding turn on the tooling or shaping mold (FIG. 7), the second section P2 corresponding to the second, third and fourth winding turns on the tooling or shaping mold (FIG. 7).

Figure 3:
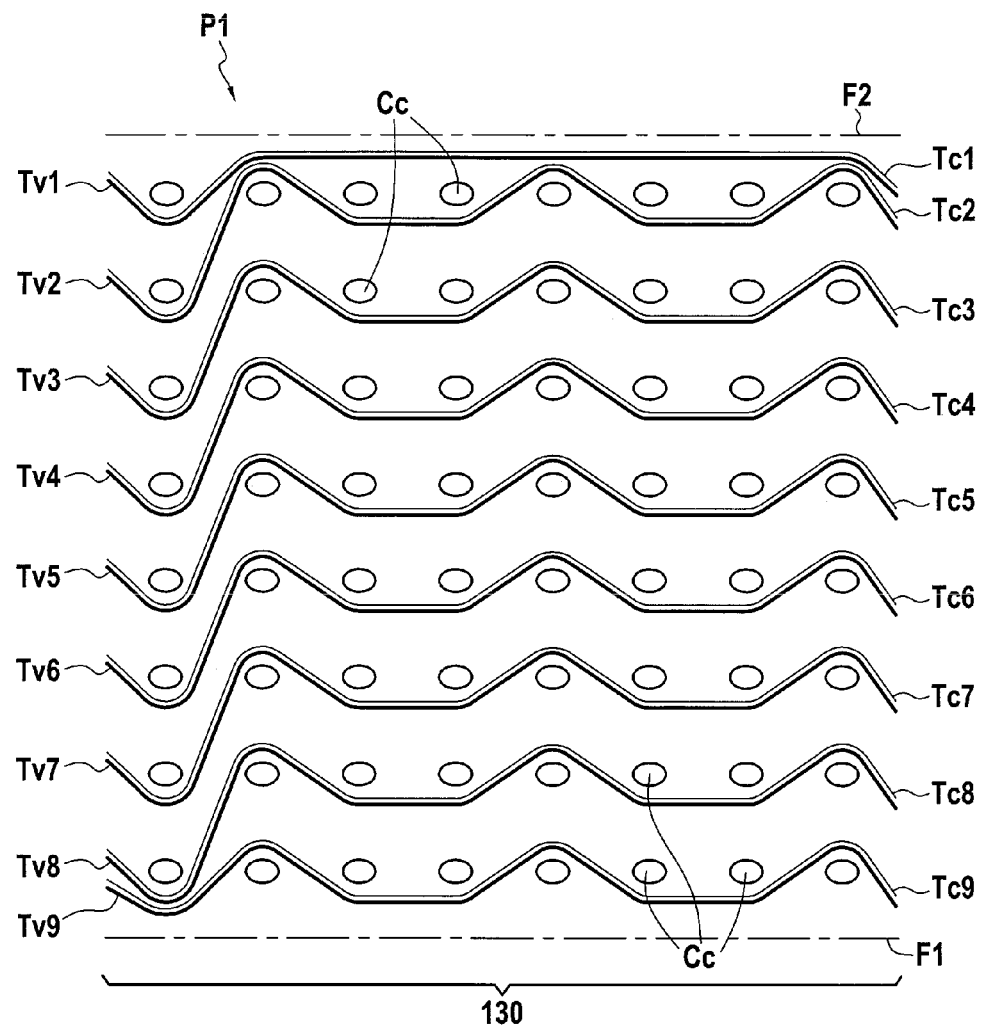
FIG. 3 is a cross-section taken at the first section of the fibrous texture of FIG. 2 and showing a weave plane.
Figure 4:
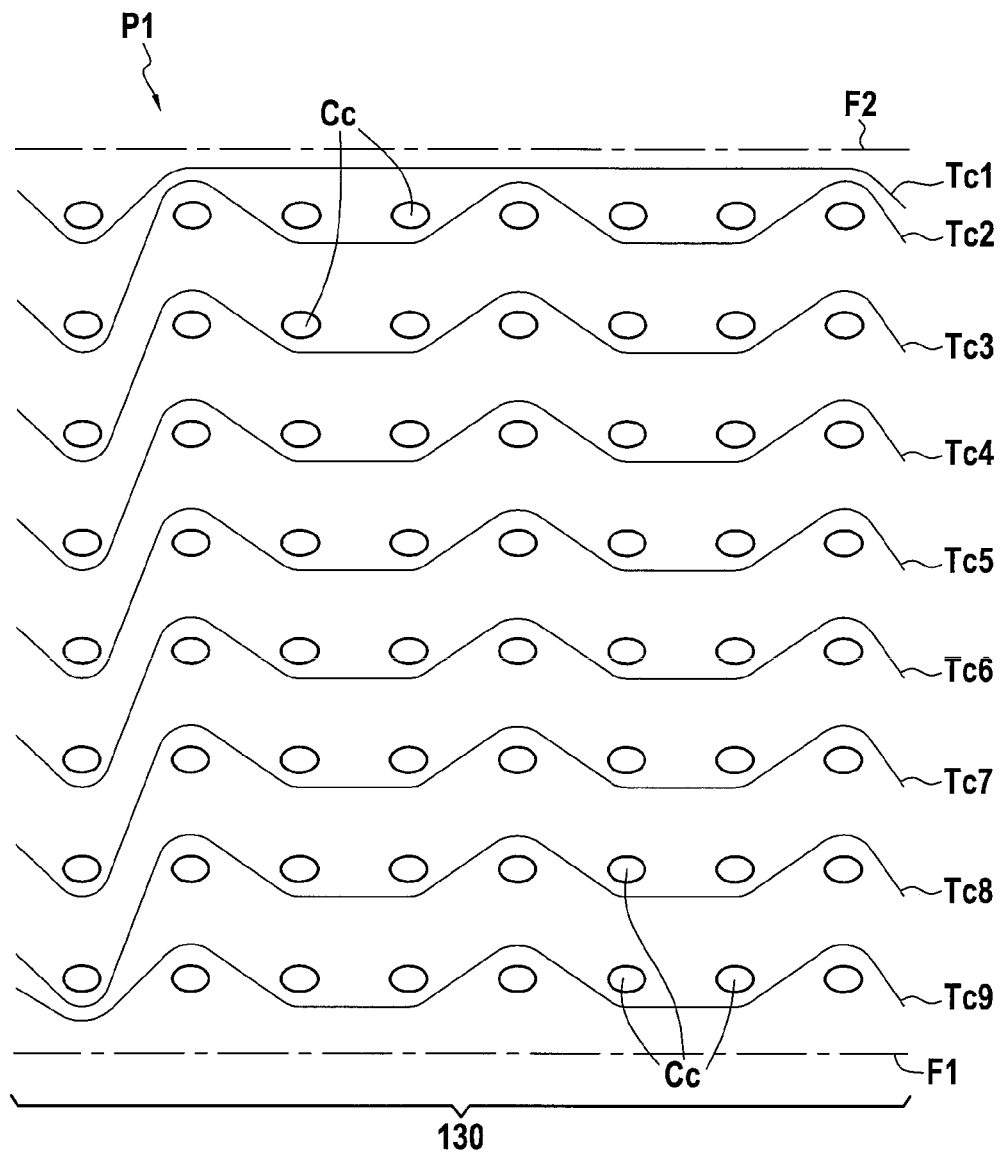
FIG. 4 is a cross-section taken at the second section of the fibrous texture of FIG. 2 and showing a weave plane.

FIGS. 3 and 4 each illustrate a plane of the multi-canvas type weave of the fibrous texture 100 located respectively at the first section P1 and the second section P2.

The examples of weave planes illustrated in FIGS. 3 and 4 comprise 9 weft layers and 8 warp layers.

As illustrated in FIG. 3, the first section P1 includes carbon fiber warp yarns or strands, denoted Cc. In accordance with the invention, the layers of the plurality of layers of weft yarns or strands consist of a plurality of groups of yarns or strands each comprising at least one carbon fiber yarn or strand and one glass fiber yarn or strand, the carbon fiber yarn or strand and the glass fiber yarn or strand of each group of yarns being woven together according to the same weaving pattern or weave. In the example described here, the 9 layers of weft yarns all consist of groups of yarns or strands each comprising a carbon fiber yarn or strand, denoted Tc1 to Tc9, and a glass fiber yarn or strand, denoted Tv1 to Tv9.

According to one variant, only some layers of the plurality of layers of weft yarns or strands present on the side of an inner face of the fibrous texture consist of a plurality of groups of yarns or strands comprising a carbon fiber yarn or strand and a glass fiber yarn or strand, the other layers of the plurality of layers of weft yarns or strands consisting of carbon fiber yarns or strands. They may for example be the four first layers from the inner face F1 of the fibrous texture 100 while the other layers of weft yarns or strands located on the side of the outer face F2 of the fibrous texture only consist of carbon fiber yarns or strands.

As illustrated in FIG. 4, the second section P2 includes carbon fiber warp yarns or strands, denoted Cc and carbon fiber weft yarns or strands denoted Tc.

There is therefore a change in the nature of the weft yarns or strands when moving along the longitudinal direction X of the fibrous texture 100.

An example has just been described in which the fibrous texture has an interlock weave with 9 weft layers and 8 warp layers. However, there is no departure from the scope of the invention when the number of weft and warp layers is different or when the fibrous texture has a weave different from a multi-canvas type weave.

Figure 5:
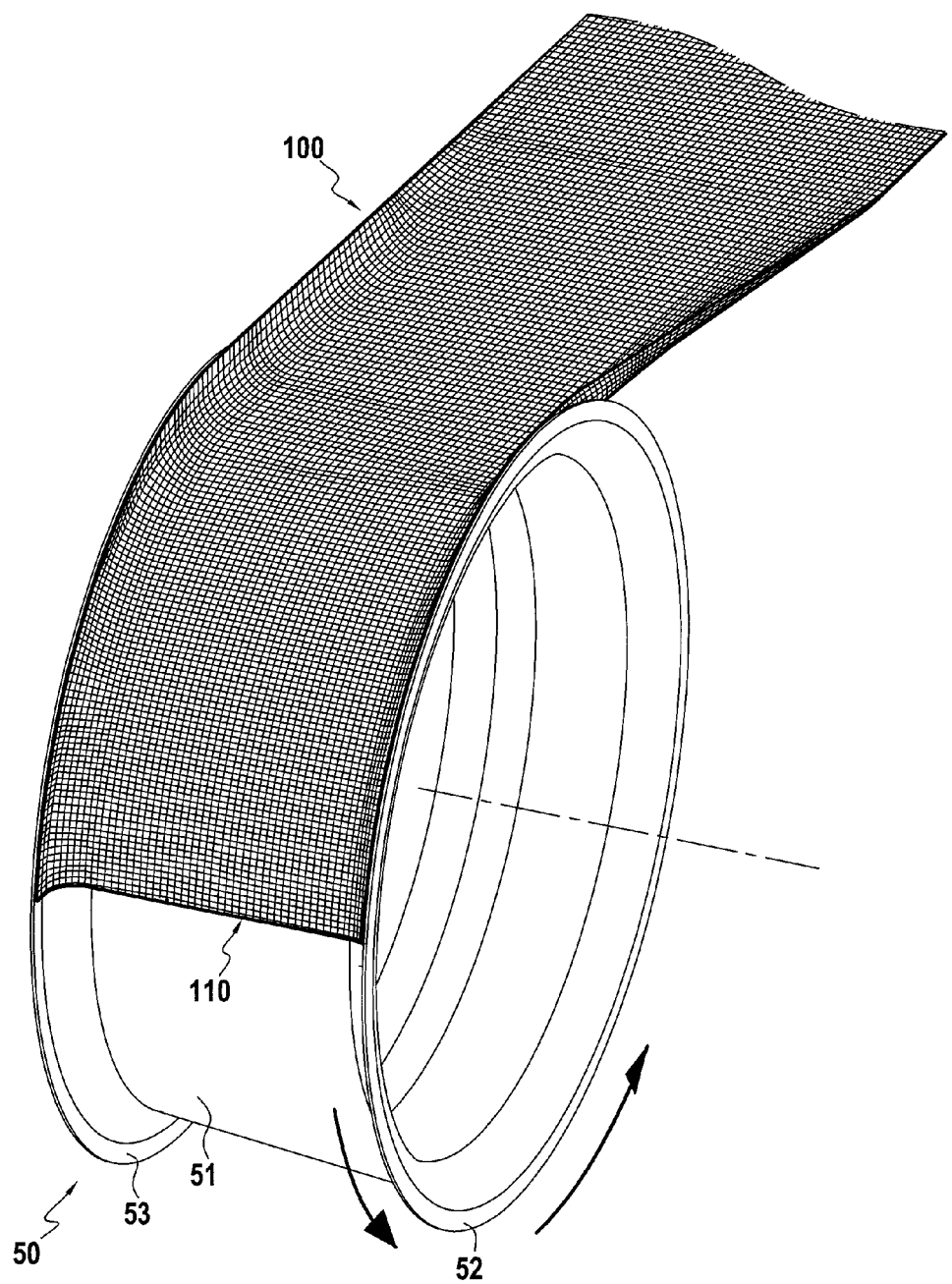
FIG. 5 is a schematic perspective view showing the winding of a fibrous texture on a shaping tooling.

As illustrated in FIG. 5, a fibrous casing reinforcement is formed by winding on a mandrel 50 of the fibrous texture 100 described above, the fibrous reinforcement constituting a complete tubular fibrous preform of a casing forming a single piece. To this end, the mandrel 50 has an outer surface 51 whose profile corresponds to the inner surface of the casing to be produced. The mandrel 50 also includes two flanges 52 and 53 to form fibrous preform portions 62 and 63 corresponding to the clamps of the casing (the clamps 62 and 63 are visible in FIG. 6). The turn(s) located radially inwardly of the preform correspond to the first section P1 of the fibrous texture and the turn(s) located radially outwardly of the preform correspond to the second section P2 of the fibrous texture.

FIG. 6 shows a sectional view of the fibrous preform 60 obtained after winding the fibrous texture 100 in several layers on the mandrel 50. The number of layers or coils depends on the desired thickness and on the thickness of the fibrous texture. It is preferably at least equal to 2. In the example described here, the preform 60 comprises 4 layers of fibrous texture 100.

The densification of the fibrous preform 60 with a matrix is then made.

The densification of the fibrous preform consists in filling the porosity of the preform, in all or part of its volume, with the material constituting the matrix.

The matrix can be obtained in a manner known per se following the liquid-process method. The liquid-process method consists in impregnating the preform with a liquid composition containing an organic precursor of the material of the matrix. The organic precursor is usually in the form of a polymer, such as a resin, optionally diluted in a solvent. The fibrous preform is placed in a mold which can be sealingly closed with a housing having the shape of the final molded part. As illustrated in FIG. 7, the fibrous preform 60 is here placed between a plurality of sectors 54 forming a counter-mold and the mandrel 50 forming a support, these elements respectively having the external shape and the internal shape of the casing to be produced. Then, the liquid matrix precursor, for example a resin, is injected into the entire housing to impregnate the preform.

The transformation of the precursor into an organic matrix, namely its polymerization, is carried out by heat treatment, generally by heating of the mold, after removal of any solvent and crosslinking of the polymer, the preform still being kept in the mold having a shape corresponding to that of the part to be made. The organic matrix can in particular be obtained from epoxy resins, such as, for example, the high performance epoxy resin sold or from carbon or ceramic matrix liquid precursors.

In the case of the formation of a carbon or ceramic matrix, the heat treatment consists in pyrolyzing the organic precursor to transform the organic matrix into a carbon or ceramic matrix depending on the precursor used and the pyrolysis conditions. For example, liquid carbon precursors can be resins with a relatively high coke rate, such as phenolic resins, while liquid ceramic precursors, in particular SiC, can be polycarbosilane (PCS) type resins or polytitanocarbosilane (PTCS) or polysilazane (PSZ). Several consecutive cycles, from impregnation to heat treatment, can be performed to achieve the desired degree of densification.

The densification of the fibrous preform can be made by the well-known transfer molding process called RTM (Resin Transfer Molding). In accordance with the RTM process, the fibrous preform is placed in a mold having the shape of the casing to be produced. A thermosetting resin is injected into the internal space delimited between the part made of rigid material and the mold and which comprises the fibrous preform. A pressure gradient is generally established in this internal space between the place where the resin is injected and the orifices for discharging the latter in order to monitor and optimize the impregnation of the preform with the resin.

The resin used can be, for example, an epoxy resin. The resins adapted for the RTM processes are well known. They preferably have a low viscosity to facilitate their injection into the fibers. The choice of the temperature class and/or the chemical nature of the resin are determined according to the thermomechanical stresses to which the part must be subjected. Once the resin has been injected into the entire reinforcement, it is polymerized by heat treatment in accordance with the RTM process.

After injection and polymerization, the part is demolded. The part is finally trimmed to remove the excess resin and the chamfers are machined to obtain a casing 810 having a shape of revolution as illustrated in the FIG. 8.

Figure 8:
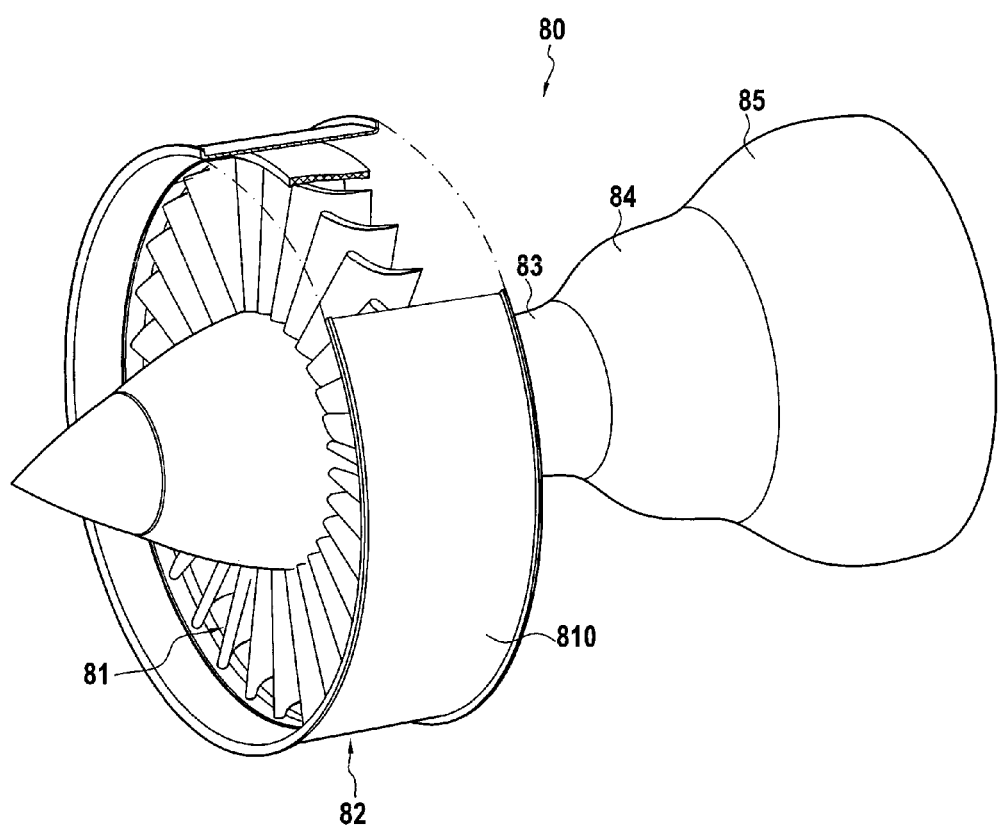
FIG. 8 is a perspective view of an aircraft engine in accordance with one embodiment of the invention.

The casing 810 represented in FIG. 8 is a casing of an aircraft gas turbine engine fan 80. Such an engine, as shown very schematically by FIG. 8 comprises, from upstream to downstream in the direction of the flow of gas streams, a fan 81 disposed at the inlet of the engine, a compressor 82, a combustion chamber 83, a high-pressure turbine 84 and a low-pressure turbine 85. The engine is housed inside a casing comprising several portions corresponding to different elements of the engine. Thus, the fan 81 is surrounded by the casing 810.

FIGS. 9A and 9B represent a variant of fibrous texture according to the invention, in which the glass fiber yarns or strands used to double the carbon fiber yarns or strands in the layers of weft yarns or strands in the first section are concentrated in an area of the fibrous texture intended to form the retention area of the casing, namely the area facing the blades likely to be impacted by the detachment of a blade or a blade fragment.

More specifically and as illustrated in FIG. 9A, the first lateral area 240 (similar to the lateral area 140 of the fibrous texture 100 of FIG. 2) of the fibrous texture 200 corresponds to an inlet portion in which the glass fiber yarns or strands Tv1 to Tv9 are gradually inserted into the layers of the plurality of layers of weft yarns or strands so as to be grouped respectively with the carbon fiber yarns or strands Tc1 to Tc9 according to the same weaving pattern or weave.

In the central area 230 (similar to the central area 130 of the fibrous texture 100 in FIG. 2), all the glass fiber yarns or strands Tv1 to Tv9 have been introduced into the fibrous texture so that the central area 230 concentrates the majority of the glass fiber yarns or strands, the area 230 forming a retention portion comprising a greater number of glass fiber yarns or strands than in the yarn or strand inlet and outlet portions. The central area 230 is the most mechanically stressed during the impact with a detached blade or blade fragment.

As illustrated in FIG. 9B, the second lateral area 250 of the fibrous texture 200 (similar to the lateral area 150 of the fibrous texture 100 of FIG. 2) corresponds to an outlet portion in which the glass fiber yarns or strands Tv1 to Tv9 are gradually withdrawn from the layers of the plurality of layers of weft yarns or strands so as to be separated respectively from the carbon fiber yarns or strands Tc1 to Tc9.

Furthermore, according to one variant, the glass fiber yarns or strands present at the lower F1 and upper F2 surfaces of the fibrous texture in the layer of weft yarns can be maintained while the other glass fiber yarns or strands present below the lower F1 and upper F2 surfaces of the fibrous texture are gradually withdrawn outside the central area of the fibrous texture. In other words, the glass fiber yarns or strands present in the groups of yarns or strands of the first layer of weft yarns or strands located as close as possible to the inner surface F1 and to the outer surface F2 of the fibrous texture are continuous over the entire length of the texture while the glass fiber yarns or strands present in the groups of yarns or strands of the other underlying layers of weft yarns or strands are gradually withdrawn from the texture outside the central area as described above. A fibrous texture is thus obtained with a first section having continuous glass fiber yarns or strands on its two surfaces. According to yet another variant, only one inner or outer surface of the fibrous texture can be provided with continuous glass fiber yarns or strands.

The invention claimed is:

1. A strip-shaped fibrous texture extending in a longitudinal direction over a determined length between a proximal portion and a distal portion and in a lateral direction over a determined width between a first lateral edge and a second lateral edge, the strip-shaped fibrous texture having a three-dimensional or multi-layered weaving between a plurality of layers of warp yarns or strands extending in the longitudinal direction and a plurality of layers of weft yarns or strands extending in the lateral direction,
wherein the strip-shaped fibrous texture comprises a first section extending along the longitudinal direction over a determined length from the proximal portion and in which one or more layers of the plurality of layers of weft yarns or strands consist of a plurality of groups of weft yarns or strands, each group of weft yarns or strands comprising at least (a) one carbon fiber yarn or strand and (b) one glass fiber yarn or strand, said at least (a) one carbon fiber yarn or strand and said (b) one glass fiber yarn or strand of each group of weft yarns or strands being woven together in pair following an identical weaving path, the strip-shaped fibrous texture further comprising a second section present along the longitudinal direction between the first section and the distal portion of said strip-shaped fibrous texture in which the layers of the plurality of weft yarns or strands consist of carbon fiber yarns or strands.

2. The strip-shaped fibrous texture according to claim 1, wherein layers of the plurality of layers of weft yarns or strands present in the first section on the side of an inner face of the strip-shaped fibrous texture include a plurality of groups of yarns or strands each comprising at least one carbon fiber yarn or strand and one glass fiber yarn or strand, the other layers of weft yarns or strands present on the side of an outer face of the strip-shaped fibrous texture consisting of carbon fiber yarns or strands.

3. The strip-shaped fibrous texture according to claim 1, wherein the first section of the strip-shaped fibrous texture includes a retention portion, a first lateral portion and a second lateral portion, the retention portion being arranged between, and adjacent to, the first and lateral portions such that the retention portion extends set back from the lateral edges of said strip-shaped fibrous texture along the lateral direction, the retention portion comprising a greater number of glass fiber yarns or strands than in the first and second lateral portions along the lateral direction.

4. A fibrous preform of an aircraft casing comprising a winding over several turns of the strip-shaped fibrous texture according to claim 1, the first section being located on the side of a radially inner face of the preform and the second section being located on the side of a radially outer face of the preform.

5. A gas turbine casing made of composite material, comprising a fibrous reinforcement consisting of a fibrous preform according to claim 4, and a matrix densifying the fibrous reinforcement.

6. The casing according to claim 5, wherein said casing is a gas turbine fan casing.

7. An aircraft gas turbine engine having a casing according to claim 5.

8. A method for manufacturing a strip-shaped fibrous texture by three-dimensional or multi-layered weaving between a plurality of layers of warp yarns or strands extending in a longitudinal direction and a plurality of layers of weft yarns or strands extending in the lateral direction, the strip-shaped fibrous structure extending in the longitudinal direction over a determined length between a proximal portion and a distal portion and in the lateral direction over a determined width between a first lateral edge and a second lateral edge,
the method comprising weaving a first section extending along the longitudinal direction over a determined length from the proximal portion and in which one or more layers of the plurality of layers of weft yarns or strands consist of a plurality of groups of weft yarns or strands, each group of weft yarns or strands comprising at least (a) one carbon fiber yarn or strand and (b) one glass fiber yarn or strand, said at least (a) one carbon fiber yarn or strand and (b) one glass fiber yarn or strand of each group of weft yarns or strands being woven together in pair following an identical weaving path, the method further comprising the weaving of a second section present along the longitudinal direction between the first section and the distal portion of said strip-shaped fibrous texture in which the layers of the plurality of weft yarns or strands consist of carbon fiber yarns or strands.

9. The method according to claim 8, wherein layers of the plurality of layers of weft yarns or strands present in the first section on the side of an inner face of the strip-shaped fibrous texture include a plurality of groups of yarns or strands each comprising at least one carbon fiber yarn or strand and one glass fiber yarn or strand, the other layers of weft yarns or strands present on the side of an outer face of the strip-shaped fibrous texture including carbon fiber yarns or strands.

10. The method according to claim 8, wherein the first section of the strip-shaped fibrous texture includes a retention portion, a first lateral portion and a second lateral portion, the retention portion being arranged between, and adjacent to, the first and lateral portions such that the retention portion extends set back from the lateral edges of said strip-shaped fibrous structure along the lateral direction, a yarn or strand inlet portion located between the first lateral edge of the strip-shaped fibrous texture and the retention portion and in which glass fiber yarns or strands are gradually inserted into layers of the plurality of layers of weft yarns or strands, and a yarn or strand outlet portion located between the retention portion and the second lateral edge of the strip-shaped fibrous texture and in which glass fiber yarns or strands are gradually withdrawn from the layers of the plurality of layers of weft yarns or strands, the retention portion comprising a larger number of glass fiber yarns or strands than in the yarn or strand inlet and outlet portions.

11. The strip-shaped fibrous texture according to claim 1, wherein the strip-shaped fibrous texture is a strip-shaped fibrous texture of a fan casing.

\* \* \* \* \*